(12) United States Patent
Echavarri Franco et al.

(10) Patent No.: US 12,479,749 B2
(45) Date of Patent: Nov. 25, 2025

(54) SYSTEM FOR COPROCESSING OIL DRILLING WASTE

(71) Applicants: Jesus Angel Gonzalez Torres, San Luis Potosi (MX); Carlos Gilberto Torres Padilla, San Luis Potosi (MX); Gabriel Enrique Mandujano Garcia, San Luis Potosi (MX); Nestor Ivan Echavarri Franco, San Luis Potosi (MX); Efren Acevedo Martinez, San Luis Potosi (MX)

(72) Inventors: Nestor Ivan Echavarri Franco, San Luis Potosi (MX); Efren Acevedo Martinez, San Luis Potosi (MX)

(73) Assignees: Carlos Torres Padilla, San Luis Potosi (MX); Jesús González Torres, San Luis Potosi (MX); Gabriel Mandujano García, San Luis Potosi (MX); Néstor Echavarri Franco, San Luis Potosi (MX); Efrén Acevedo Martinez, San Luis Potosi (MX)

(*) Notice: Subject to any disclaimer, the term of this patent is extended or adjusted under 35 U.S.C. 154(b) by 0 days.

(21) Appl. No.: 19/071,548

(22) Filed: Mar. 5, 2025

(65) Prior Publication Data
US 2025/0214878 A1    Jul. 3, 2025

Related U.S. Application Data

(63) Continuation of application No. PCT/MX2023/050036, filed on Jun. 19, 2023.

(30) Foreign Application Priority Data

Sep. 5, 2022 (MX) .................. MX/a/2022/011010

(51) Int. Cl.
*C02F 9/00* (2023.01)
*B01D 3/06* (2006.01)
(Continued)

(52) U.S. Cl.
CPC .................. *C02F 9/00* (2013.01); *B01D 3/06* (2013.01); *B01D 3/38* (2013.01); *B01D 17/047* (2013.01);
(Continued)

(58) Field of Classification Search
None
See application file for complete search history.

(56) References Cited

U.S. PATENT DOCUMENTS

| | | | |
|---|---|---|---|
| 2003/0155158 A1* | 8/2003 | Szymocha | B09B 3/00 134/22.16 |
| 2017/0073591 A1* | 3/2017 | Dasgupta | B01D 11/04 |

FOREIGN PATENT DOCUMENTS

| | | |
|---|---|---|
| WO | WO2005046894 A1 | 5/2005 |
| WO | WO2007087595 A1 | 8/2007 |
| WO | WO2017074197 A1 | 5/2017 |

OTHER PUBLICATIONS

International Search Report and Written Opinion of the International Searching Authority from the Mexican Institute of Industrial Property, in PCT/MX2023/050036 dated Nov. 11, 2023, to which this application claims priority.

* cited by examiner

*Primary Examiner* — Clare M Perrin
(74) *Attorney, Agent, or Firm* — Kolitch Romano Dascenzo Gates LLC

(57) ABSTRACT

A co-processing that includes converting oil drilling waste into a material with technical characteristics that can be used as fuel or alternative raw material for a specific petrochemical process. In the co-process, the components that make up (Continued)

the waste such as solid, oil, and water are recovered. The co-process is a self-sustaining process, reducing gas emissions into the atmosphere, accompanied by savings in the operating cost of the process.

19 Claims, 1 Drawing Sheet

(51) Int. Cl.
*B01D 3/38* (2006.01)
*B01D 17/04* (2006.01)
*B01D 21/28* (2006.01)
*B01D 45/16* (2006.01)
*B01D 53/86* (2006.01)
*B03C 1/03* (2006.01)
*B03D 3/06* (2006.01)
*C02F 1/00* (2023.01)
*C02F 1/04* (2023.01)
*C02F 1/40* (2023.01)
*C02F 1/48* (2023.01)
*C02F 1/52* (2023.01)
*C02F 101/32* (2006.01)
*C02F 103/10* (2006.01)

(52) U.S. Cl.
CPC ........... *B01D 21/283* (2013.01); *B01D 45/16* (2013.01); *B01D 53/86* (2013.01); *B03C 1/03* (2013.01); *B01D 2258/0283* (2013.01); *B03C 2201/18* (2013.01); *C02F 1/004* (2013.01); *C02F 1/04* (2013.01); *C02F 1/40* (2013.01); *C02F 1/48* (2013.01); *C02F 1/52* (2013.01); *C02F 2101/32* (2013.01); *C02F 2103/10* (2013.01)

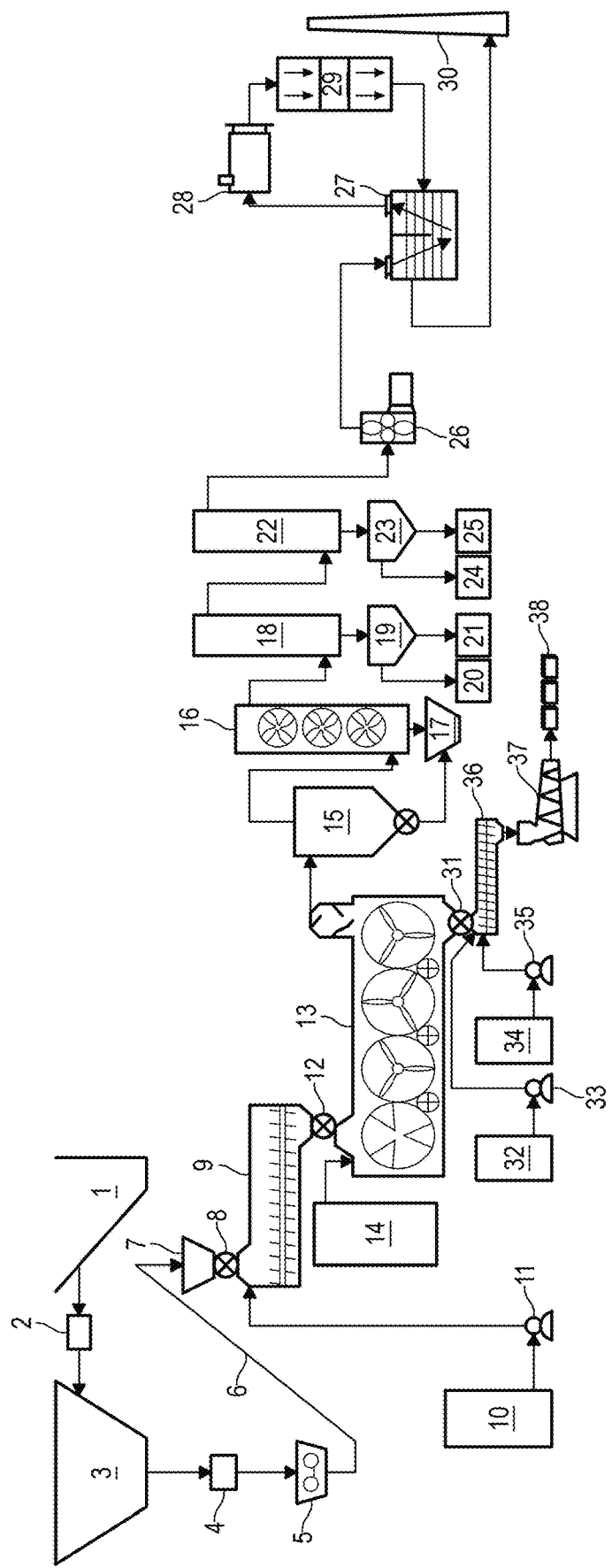

SYSTEM FOR COPROCESSING OIL DRILLING WASTE

TECHNICAL FIELD

The present disclosure is in the field of waste treatment processes of the oil industry, more specifically in the co-processing that consists of converting the waste into a material with characteristics that can be valued as an alternative fuel or raw material.

BACKGROUND

Considering the need to have waste treatment processes in the petrochemical industry, more specifically oil drilling waste, in the industry, processes and co-process have been developed with the aim of reusing the products, as well as to avoid pollution; the background information that is in the state of the art that describes and makes known these processes is:

The document CN216377876 (U)-2022-04-26 is a utility model related to the technical field of sludge treatment based on waste oil of oil drilling, in particular to a mud cleaning and reduction equipment system based on residual oil of an oil drilling method. The equipment structurally comprises a support, a first spiral conveyor is arranged on the support, one end of the first spiral conveyor is used for feeding, the other end of the first spiral conveyor is connected with a rotating dryer, the rotating dryer is connected with a horizontal centrifugal machine through a pipe on the outer wall of a machine housing of the rotating dryer, and a second spiral dryer is arranged in an outlet at the bottom of the rotating dryer. A mud outlet from the horizontal centrifugal machine communicates with the second screw conveyor, and the horizontal centrifugal machine communicates with a drilling well through a pipe and is used to transport the residual oil-based mud treated for drilling. According to oil drilling during drilling, the mud cleaning and reduction equipment system based on residual oil, equipment without mud landing is adopted, the residual mud is reduced and recycled, and in addition, the separation and recycling of the residual mud and rock rubble can be achieved. However, the document CN216377876 (U) does not describe or make known a system that treats both solid waste and fluids (oil and water)

SUMMARY

Co-processing of the present disclosure comprises converting waste into a material with characteristics that can be valued as an alternative fuel or raw material for a specific petrochemical process, where the components that comprise it (solid, oil and water) are recovered with the purpose of being used to obtain products and by-products that present technical characteristics such that they can be reused to formulate drilling fluids and to produce necessary heat energy as input in the same process, being a self-sustaining process, reducing gas emissions to the atmosphere, accompanied by savings in the operation cost of the process.

An object of the present disclosure is a co-processing of special management waste from the oil industry where the components that comprise (solid, oil and water) are recovered. Where recovered oil is reused to formulate drilling fluids and to produce necessary heat energy as input in the same process, being a self-sustaining process, reducing gas emissions to the atmosphere, accompanied by savings in the operation cost of the process.

Water is used in cooling systems. The hydrocarbons free solids are used in the following percentages: 60% of these solids are used to level and fill low land, another 20% is used for base and sub-base in the formation of paths and roads, the rest (20%) to form a material composed of ceramic matrix of high properties avoiding pollution due to the emission of particles suspended in the air that damages the health of workers, eliminating the storage of large amounts of inert solids with a high content of heavy metals in confinement cells, thus complying with national and international environmental laws In the present disclosure, it is understood as a co-process, the process that consists of converting the waste into a material with characteristics that can be valued as an alternative fuel or raw material for a specific industrial process, that is, co-processing is a process in which non-recyclable waste is used to generate energy and use it for the manufacture of raw material.

An oil drilling waste co-process is one where the process begins with the analysis of the oily residue that will feed the process (1) to know the percentages of each of the components (water, oil and solid), to adjust the operation parameters of the process. After the mixture, any solid object (2) is removed and any metallic object (4) is separated, consequently it is pre-conditioned with a mechanical segregator (5) to increase the efficiency of the effect of the surfactant (10 and 11) in the high-efficiency variable speed mixer (9).

Solids enter the high thermal efficiency paddle dryer (13) where hydrocarbon-free solids come out from the lower part and enter a hydration process (36), in which an inorganic microsilica-based catalyst (34 and 35) and a chemical hydrator (32 and 33) are added to form a composite material (37), which is subjected to a heat treatment (38) To increase mechanical properties.

The evaporated fluids exit through the top of the paddle dryer and enter the first separation of solid particles consisting of two cyclones placed in parallel (15), solid-free gases pass to a second step of separation (16), in which the objective is to generate a micrometric particle capture due to the condensation of alkalis salts. Clean gases are subject to thermal shock by heat exchangers (18) placed in series to generate a flash condensation process and avoid the formation of highly polluting aromatic compounds.

In the lower part of the first exchanger the condensate of medium fraction hydrocarbons (20) is recovered, this oil has good properties to formulate reverse emulsion drilling sludge. In the second exchanger, a condensate of light hydrocarbons (24) that is used in the combustion process (14 and 28) is obtained, allowing the process to be self-sustaining and avoiding gas emissions to the atmosphere. The recovered water (21 and 25) is used in the process cooling system and the non-condensate gases pass to the catalytic oxidation system (28 and 29) where all the pollutants are burned to finally come out through the chimney (30) to the atmosphere.

BRIEF DESCRIPTION OF THE DRAWINGS

FIG. 1 shows a process diagram where the parties that make up the co-processing of special management waste that has as its main objective the recovery of the liquids used in the drilling and decontaminating the solid for reuse in the drilling and construction industry respectively are observed. The process diagram is made up of the following elements:
1. Oily waste receiving cell.
2. Solid control equipment.
3. Feeding cell.

4. Magnetic particle separator.
5. Mechanical segregator.
6. Drag conveyor.
7. Feeding hopper.
8. Rotary valve 1
9. High efficiency mixer.
10. Surfactant storage tank.
11. Surfactant dosing pump.
12. Rotary valve 2.
13. High thermal efficiency paddle dryer
14. Combustion chamber for the paddle dryer.
15. High efficiency dual cyclone.
16. Micrometric particle separator.
17. Solid mechanical scraper.
18. Heat exchanger for condensing C-14 to C-18 oil.
19. Separator tank of IC-I.
20. Oil condensate for inverse emulsion fluid.
21. Water condensate of IC-IA.
22. Heat exchanger to condensing oil less than C-14.
23. Separator tank of IC-AI.
24. Oil condensate for consumption in the combustion chamber.
25. Water condensate of IC-AI.
26. Induced draft fan.
27. Combustion gas heat exchanger.
28. Combustion chamber for non-condensed gases.
29. Fixed bed neutralizer.
30. Chimney.
31. Rotary valve 3.
32. Chemical hydrant storage tank.
33. Chemical hydrant dosing pump.
34. microsilica-based catalyst storage tank.
35. Catalyst dosing pump.
36. High shear paddle helical.
37. Extrusion of solids for partitions.
38. Thermal treatment to the composite material.

DETAILED DESCRIPTION

The present disclosure refers to a co-process of oil drilling waste in order to be reused in the drilling and construction industry.

The principle of the present disclosure's process is a combination of two methods: a chemical process (surfactant addition) and a physical process (dried by heat transfer by convection combined with a distillation process by water vapor drag in a hermetic system) coupled to a system of separation of fine solids and a flash type condensation.

Initially a sample of the residue is taken to be co-processed and analyzed to know the percentages of water, oil, and solids, to adjust the process operation parameters. Subsequently, in the preparation of the feeding, any solid object larger than ½ inch in diameter is removed from the mixture and any metallic object is separated, consequently it is pre-conditioned with a mechanical segregator to increase the reactive surface area of the solid, increasing the efficiency of the surfactant effect on the mixer.

To the input of the high-efficiency variable speed mixer, a surfactant is added through a dosing flute ensuring the integration of the reagent into the oily mixture with the aim of reducing the interfacial tension between the water-oil fluid and the surface tension of the fluid with the solid, changing the wettability and favoring the release of the oil trapped in the intergranular matrix.

At the exit of the mixer, the residue with surfactant enters a hermetic dryer. The dryer is supplied by hot gases generated by a combustion chamber, these impact the solids that move through the lower part of the dryer generating a heat transfer by convection in 4 transverse sections. In each section there is a high shear paddle helical allowing the passage of solids between sections generating high thermal efficiency. In addition to the dryer convection process, fluids are released by means of a distillation process by water vapor drag, these two heat transfer processes make the solid decontamination of hydrocarbon fluids highly efficient.

Hydrocarbons-free solids come out through the bottom of the last cross section of the dryer at temperature between 250 to 280° C. Finally, solids pass through a hydration process by means of a high shear paddle helical. 60% of these solids are used to level and fill low land, another 20% is used for base and sub-base in the formation of paths and roads, the rest (20%), is added with an inorganic microsilica-based catalyst obtained from the burning of palm fiber and considered as a residue considered as residue from the process of obtaining vegetable oil to accelerate the hydration reactions and form a hydraulic linkage based on hydrated calcium silicate and form a composite material, the microsilica that accelerates puzolanic reactions by providing green resistance. The co-processing of solids allows eliminate dust emissions into the atmosphere and the storage of large amounts of inert solids in confinement cells, which is currently an environmental problem. Finally, the composite material is subject to a heat treatment where the microsilica-based catalyst allows grain growth generating a reduction in intergranular porosity by increasing physical, chemical, and thermal properties. During this process the liquid phase (chemical binding at high temperature) transforms heavy metals into oxides avoiding pollution to the environment and can be used in the construction industry, by presenting structural stability allowing the formation of a brick type dense compound material of standard dimensions of good properties and with <300 ppm of hydrocarbons. The phases present in the hydrocarbon-free solids are the same at each step of the process and are mainly $BaSO_4$, $SiO_2$, $CaCO_3$, $CaSO_4$ and $(Na_{0.84}Ca_{0.16})Al_{1.16}Si_{2.84}O_8$ and the crystalline structure is not modified by the thermal effect, except for the $(Na_{0.84}Ca_{0.16})Al_{1.16}Si_{2.84}O_8$ which has the property of expanding or contracting as a result of the temperature without breaking or modifying it. These results are in accordance with the thermodynamic predictions made with FACTSAGE 5.5 software with the chemical composition determined by ray fluorescence.

Fluids evaporated from hydrocarbons and water come out through the top of the high thermal efficiency paddle dryer in the last cross section at temperature between 240 to 260° C. These gases enter the solid particle separation system consisting of two cyclones placed in parallel, through the tangential force generated within the cyclones by the gas flow velocity, generating that solid particles collide with the cyclone walls and are sent to the lower part of the cyclone for removal, these particles contain a high percentage of residual hydrocarbons, therefore they are sent back to the process feeding cell.

Gases free of solid particles that come out at temperature between 21° and 220° C. pass to a second step of separation, in which the objective is to generate a micrometric particles capture due to the condensation of alkalis salts reducing the temperature between 2° and 30° C., generating the solid particles agglomeration suspended in the gas stream, to be subsequently removed by the lower part mechanically and sent to the feeding cell where oily waste is mixed.

Clean gases come out at temperature of 160° C. and are subjected to a thermal shock with a stream of cold water (30° C.) in an arrangement of tube and shell-type heat exchangers, generating a flash condensation process to avoid the formation of highly polluting aromatic compounds. At this step, the exchangers are placed in series to ensure the condensation of medium and light fraction hydrocarbons. In the lower part of the first exchanger the condensate of hydrocarbons of medium fraction from C-14 to C-18 is recovered, this oil has good properties to formulate reverse emulsion drilling sludge. In the second exchanger, a condensate of light hydrocarbons (lower than C-14) is obtained, the latter can be reused in the combustion process allowing the process to be sustainable avoiding gas emissions into the atmosphere. Non condensate gases pass to the catalytic oxidation system where an induced draft fan sends the gases to a heat exchanger to later send them to the combustion chamber where all polluting gases are burned additionally pass to a fixed bed neutralizer which absorbs the remaining pollutants to return them to the heat exchanger as the hot phase to finally exit the current of non-condensable gases through the chimney without harmful pollutants into the atmosphere.

Feeding

The cuts are transferred to the feeding system, this is designed to clogging-proof, whose vibratory mesh removes any solid object larger than half an inch in diameter and separates any object, by means of the vibration of two vibrates engines of 2.5 HP each, which allow the material to slide slowly, avoid accumulation of it.

The material that passes through the mesh reaches a drag conveyor, which meets the function of raising the material to the highest part of the high-efficiency variable speed mixer. Subsequently, any metallic object is separated from the mixture by means of a magnetic particle rotary separator, consequently it is pre-conditioned with a mechanical segregator that increases the reactive surface area of the marine region cuts that are mostly scalp type flakes that keep hydrocarbons trapped in the solid.

Before entering the mixer, the mixture falls to a continuous weighing hopper that quantifies the feeding in Ton/h, by displacement of the rotary valve installed in the lower part of the hopper and controlled by a frequency variator so that a pressure column that ensures the continuous flow and makes a seal to prevent the retreat of vapors generated inside the interior of the high-efficiency paddle dryer is exercised.

High-Efficiency Variable-Speed Mixer

A surfactant in a solution in a ratio of 0.1 to 1% of weight concentration through a dosing flute is added to the entry of high-efficiency variable speed mixer, ensuring the integration of the reagent with the oily mixture with the aim of reducing the interfacial tension between the water-oil fluid and the surface tension of the fluid with the solid changing wettability and promoting the release of oil trapped in the intergranular matrix. The mixer is operated by a 25 HP engine, conditioned to a reducer, and governed by a variable speed control mechanism, operated from the control room. This system allows to vary the residence time of the waste-fed load and conditioning the operating parameters that are the concentration of surfactant and temperature, in each equipment in the ranges established in Table 1.

TABLE 1

| Operation Conditions | |
|---|---|
| Equipment | Temperature ° C. |
| High-efficiency variable speed mixer | 20 to 30 |
| High thermal efficiency paddle dryer | 300 to 350 |
| Paddle dryer hood | 240 to 260 |
| High efficiency dual cyclone outlet | 210 to 220 |
| Micrometric particle separator outlet | 160 to 180 |
| Outlet of the first heat exchanger | 65 to 75 |
| Outlet of the second heat exchanger | 25 to 35 |
| Outlet of the thermal oxidizer | 380 to 450 |
| Outlet of the Chimney | 35 to 45 |

High Thermal Efficiency Paddle Dryer

The high-efficiency variable speed mixer sends the material to a high thermal efficiency paddle dryer of 2.4 m diameter, generating a steam distillation process, due to the effect of the hot gases that are supplied through a combustion chamber operating at sub-stoichiometric levels to avoid combustion reactions of the hydrocarbon vapors released from the solid. The hot gases impact on the solids through four cross sections that generate a forced convection and the transition helicals placed between the sections generate a greater transfer of gases to the solids due to the high shear stress, achieving decontamination of the waste, complying with the levels permissible by the environmental authorities (<300 PPM).

The objective of the high-efficiency paddle dryer is to separate the solid and liquid phases, for which the temperature of the cuttings will be increased to values above the water vaporization points 100° C. and of hydrocarbons 288° C.-482° C.

The solids are discharged in the final part of the hydrocarbon-free paddle dryer through a rotary valve to keep the generated gases airtight and enter a solids hydration process, in which an inorganic catalyst based on microsilica and a chemical hydrator are added to form a composite material.

The residence time in the high energy efficiency paddle dryer is 10 minutes, a critical parameter in this phase, since a shorter retention time would cause incomplete drying, therefore, the treated material could not be disposed in the environment due to non-permissible oil content. To comply with this parameter, the mixer will be driven by two 25 HP motors. The first motor is coupled to a helical reducer, which transmits rotation through a double-pitch chain 120 that meshes and drives the first section, the transition helical and the second section. The electronic speed variator provides rotation between 35 10 and 40 RPM at maximum load. The second motor drives the second transition helical section, the third section and the third helical and the fourth section.

The paddle dryer is connected to a combustion chamber with walls insulated with refractory brick (Refmex 40/60). This chamber has two burners designed to burn recovered diesel, which are able to transfer a real thermal load of heat 10 MMBTU/h. At the front, this furnace has a maintenance hole for review, inspection, and maintenance of the chamber. The metal cover is sealed with refractory brick and mortar, to prevent the entry of oxygen and the loss of vapors to the environment. In addition to all of the above, the paddle dryer has two paddle helical placed between sections to allow passage between sections.

The movement of the material inside the paddle dryer in the first section is of utmost importance and is designed in a spiral to allow the free passage of hot gases. The first section is subject to high shear stress and high temperature; to protect this section, an internal cooling system was implemented, which consists of passing cooling water through the tube center of each section. The paddles are made of chrome carbon alloy to combat abrasion, erosion and withstand the high temperatures of the hot gases in the chamber.

Due to the effects of heat, the cuttings tend to adhere to the walls and form a thick layer of very hard material that is difficult to remove, causing many problems, since the heat transfer to the interior of the paddle dryer decreases substantially, causing a decrease in process efficiency. To do this, there are three paddle helicals inside the dryer that rotate in the same direction, thus moving the material between sections.

In the event of a failure or unexpected power outage, an electric power generator immediately starts working to maintain the rotation of the internal sections of the dryer until the loaded material is removed and thus prevent the risk of fire internally due to the accumulation of material and vapors.

The high energy efficiency paddle dryer generates two outlets that must be treated to comply with national and international environmental legislation.
1) Inert solids, free of hydrocarbons, which come out from the bottom of the last cross section of the high-temperature dryer (280-300° C.) for further treatment.
2) Evaporated fluids composed of hydrocarbons, water, and gases such as Nox, SO2, CO and CO2 that come out from the top of the paddle dryer and entering the first separation of solid particles consisting of two cyclones placed in parallel; the solid-free gases pass to a second separation step, in which the objective is to generate a capture of micrometric particles by the effect of the condensation of alkali salts. The clean gases are subjected to a thermal shock by heat exchangers to generate a flash condensation process and prevent the formation of highly polluting aromatic compounds.

Treatment of Inert Solids

The hot hydrocarbon-free solids pass through a 20" rotary valve, whose main function is to prevent air from entering the interior of the paddle dryer. Following this, the dry material is discharged into a solid hydration system that is made up of two 12" diameter paddle helicals, generating a hydration process in which an inorganic catalyst based on microsilica $H_2O+Na_2SiO_3$ is added to accelerate the pozzolanic reactions that provide mechanical strength to the composite material. The wet solids enter an extruder to form a dense material that, when dried, acquires good mechanical strength in green, allowing the composite material to be manipulated thanks to the catalyst added during hydration. Finally, the composite material is subjected to a heat treatment where the microsilica-based catalyst allows grain growth, generating a reduction in intergranular porosity, increasing the physical, chemical, and thermal properties. During this process, the liquid phase (high temperature chemical binder) transforms heavy metals into oxides, preventing environmental pollution and the dense material can be used in the construction industry.

Treatment of the Vapor Mixture

The evaporated hydrocarbon and water fluids exit at temperatures of 240 to 260° C. through a hood placed at the top of the last cross section of the high thermal efficiency paddle dryer. The hood is designed to generate particle collision due to the effect of the screens, achieving to retain granulated solids that fall due to the effect of gravity and are removed from the dryer by the rotary valve.

These gases enter through a rectangular duct to two cyclones placed in parallel, through the tangential force generated by the speed of the gas flow, causing the solid particles to collide with the walls of the cyclone and due to the gravity effect they fall to the lower part of the same to be removed, because they contain a high percentage of residual hydrocarbon (1,000 ppm), therefore, they are sent back to the process conditioning cell.

Cyclones placed in parallel remove fine solids by the effect of the vortex breaking, where the streams of hydrocarbon vapors free of solid particles exit at temperatures of 200 to 220° C. through a duct placed in the central part of each cyclone, which leads them to a second separation step to capture micrometric particles by the effect of the condensation of alkali salts.

In this second separation step, the hydrocarbon vapors decrease their temperature between 3° and 40° C. by the effect of three 3 HP fans placed on the outside that operate depending on the outlet temperature of the hydrocarbon vapors, generating the condensation of heavy hydrocarbons present in the stream. Subsequently, the agglomerated particles are mechanically removed through the bottom and sent to the process conditioning cell.

Clean gases come out the micrometric particles separator at temperatures of 170° C. to 190° C. and are subjected to a thermal shock in an arrangement of tube and shell-type heat exchangers, generating a flash condensation process to prevent the formation of highly polluting aromatic compounds. The exchanger is made up of an internal arrangement of 450 to 485 tubes, preferably 470 tubes, through which the recovered water from the cooling tower is circulated, while steam circulates on the outside, producing a heat exchange with the hot vapors. Flash condensation occurs when the vapors are brought to the dew point, achieving the condensation of water and hydrocarbon vapors. The condensed vapor is temporarily stored in the condensate collector, located at the bottom of the exchanger. Inside the collector, there is a float-type current switch, which will activate the pump to evacuate the liquid when it reaches a certain level.

The cooling tower is used to remove heat from the system and once it has fulfilled its function, the used water returns to it, so that the system operates as a closed circuit, with a recirculation flow of 3,785 LPM (1,000 GPM), with an approximate pressure of 3.52 kg/cm2 (50 PSI). The cooling tower, the heat exchanger and the condensation system have the capacity to remove 10 MM BTU/h of heat from the system at the maximum average of dew point temperature, achieving recovery the medium fraction hydrocarbons (C-14 to C-18) in the first exchanger, while in the second exchanger a condensate of light hydrocarbons (less than C-14) used in the combustion process is obtained, allowing the process to be self-sustaining.

The exchanger has two outlets:
1) The condensed vapors (now in liquid state) in both exchangers are sent to their corresponding separator tank for treatment.
2) A fraction of the vapors that cannot be condensed must be destroyed.

To meet this objective, there is a thermal oxidizer, which has a burner that converts the vapors into CO and CO2, using 5 MM BTU/h. The thermal oxidizer is designed to burn only a small amount of fuel. In addition, for safety, there is a flame trap, which isolates the oxidizer from the rest of the system and prevents the produced flames from entering the exchanger. However, before reaching the thermal oxidizer, the vapors enter a heat exchanger, which works as the last condensation system to finally exit the non-condensable gas stream free of harmful contaminants through the chimney into the atmosphere.

Condensation is the critical factor in the operation of the plant, since poor system performance is due to blockage in the heat exchanger fluxes and manifests itself in a high accumulation of steam in the paddle dryer, to the point that its seals can give way and allow volatile material to escape. Oil vapor, at high temperatures and exposed to air, can cause fire. However, as a preventive measure, there is a water irrigation system inside the equipment and ducts, which starts working when there is a flame. The passage of water is controlled by a solenoid valve. If a blockage in the heat exchanger were to occur, the plant must be stopped to perform the respective maintenance.

Treatment of Condensed Vapors

Once the gas phase has been separated from the liquid phase, the components of the latter can be separated, i.e., water and oil. The water/oil separation unit consists of the following 2 tanks:
  Condensate collection tank.
  Water-oil separation tank.

The first tank serves to receive the condensates from heat exchanger 1, in order to separate them into the mixture. The separated solids are sent by gravity to the conditioning reception cell, while the liquid phase passes directly to the water-oil separation tank. This tank has the characteristics of a gravitational separator tank, and a large part of the drained liquids go directly to the oil storage tank.

The second tank is the separator tank. In this phase of the process, the condensed liquid is separated by density differences, three clearly differentiated levels are stratified: oil, water, and solids, each of which is recovered and sent to the corresponding storage tanks.

Enumerated Paragraphs

The following enumerated paragraphs reflect various aspects and combinations of the present disclosure.
  A0. A co-processing system for oil drilling waste, wherein the waste passes through the following steps to recover solids, water, and drilling fluids:
    a. Analysis of the oily waste that will be fed to the process (1),
    b. Elimination of solid waste from the mixture (2), any metallic object (4) is separated,
    c. Pre-conditioning with a mechanical segregator (5) to increase the efficiency of the surfactant effect (10 and 11) in the high-efficiency variable speed mixer (9),
    d. Drying of the solids in the high thermal efficiency paddle dryer (13),
    e. Hydration of solids (36),
    f. Thermal treatment of solids (38),
    g. Outlet of evaporated fluids through the top of the paddle dryer,
    h. Double separation of solid particles by means of two cyclones placed in parallel (15),
    i. Condensation of alkali salts.
    j. Thermal shock of clean gases by means of heat exchangers (18 and 22),
    k. Recovery of the middle fraction hydrocarbon condensate (20) in the first exchanger,
    l. Recovery of light hydrocarbon condensate (24),
    m. Recovery of water (21 and 25) is used in the process cooling systems,
    n. Catalytic oxidation system of non-condensed gases (28 and 29).
  A1. The co-processing system for oil drilling waste according to A0, characterized in that in the solid waste removal step any solid object larger than ½ inch in diameter is removed and any metallic object is separated, it is pre-conditioned with a mechanical segregator to increase the reactive surface area of the solid, increasing the efficiency of the surfactant effect into the mixer.
  A2. The co-processing system for oil drilling waste according to A0, wherein in the high thermal efficiency paddle dryer (13) the hydrocarbon-free solids exit through the lower part.
  A3. The co-processing system for oil drilling waste according to A2, wherein in the high thermal efficiency paddle dryer, in addition to the convection process in the dryer, the fluids are released by means of a water steam drag distillation process, these two heat transfer processes make the decontamination of the solid from the hydrocarbon fluids highly efficient.
  A4. The co-processing system for oil drilling waste according to A2, wherein in the high thermal efficiency paddle dryer the hydrocarbon-free solids exit through the lower part of the last cross section of the dryer at temperature between 25° and 280° C.
  A5. The co-processing system for oil drilling waste according to A0, wherein in the solids hydration step (36), an inorganic catalyst based on microsilica (34 and 35), and a chemical hydrator (32 and 33) are added to form a composite material (37).
  A6. The co-processing system for oil drilling waste according to A5, wherein in the solids hydration step, the solids undergo a hydration process by means of a high shear paddle helical.
  A7. The co-processing system for oil drilling waste according to A5, wherein in the solids hydration step, the inorganic catalyst based on microsilica is obtained from the burning of palm fiber and accelerates the hydration reactions and forms a hydraulic binding based on hydrated calcium silicate and forms a composite material.
  A8. The co-processing system for oil drilling waste according to A0, wherein in the thermal treatment step (38) the mechanical properties are increased.
  A9. The co-processing system for oil drilling waste according to A8, wherein the composite material is subjected to a thermal treatment where the microsilica-based catalyst allows grain growth, generating a reduction in intergranular porosity, increasing the physical, chemical, and thermal properties. During this process, the liquid phase (high-temperature chemical binder) transforms heavy metals into oxides, preventing environmental contamination, and they can be used in the construction industry because they have structural stability and allow the formation of a dense brick-type composite material of standard dimensions with good properties and <300 ppm of hydrocarbons.
  A10. The co-processing system for oil drilling waste according to A0, wherein the evaporated hydrocarbon and water fluids exit through the upper part of the high thermal efficiency paddle dryer at temperatures between 240 to 260° C. The gases enter the solid particle separation system consisting of two cyclones placed in parallel (18 and 22), by means of the tangential force generated within the cyclones by the speed of the gas flow, causing the solid particles to collide with the walls of the cyclone and be sent to the lower part thereof to be removed.

A11. The co-processing system for oil drilling waste according to A10, wherein in the step of thermal shock of the clean gases by means of heat exchangers (18 and 22), the exchangers are placed in series to generate a flash condensation process and avoid the formation of highly polluting aromatic compounds.

A12. The co-processing system for oil drilling waste according to A10, wherein the gases free of solid particles that exit at temperature between 21° and 220° C. pass to a second separation step, capturing the micrometric particles by the effect of the condensation of alkali salts, reducing the temperature between 2° and 30° C., generating the agglomeration of solid particles suspended in the gas stream, to be subsequently removed by the lower part mechanically and sent to the feeding cell where oily waste is mixed.

A13. The co-processing system for oil drilling waste according to A10, wherein the clean gases exit at temperature of 160° C. and are subjected to a thermal shock with a stream of cold water (30° C.) in an arrangement of heat exchangers.

A14. The co-processing system for oil drilling waste according to A0, wherein the exchangers are placed in series to ensure the condensation of medium and light fraction hydrocarbons. In the lower part of the first exchanger, the condensate of medium fraction hydrocarbons of C-14 to C-18 is recovered. In the second exchanger, a condensate of light hydrocarbons (less than C-14) is obtained.

A15. The co-processing system for oil drilling waste according to A0, wherein in the step of recovering the medium fraction hydrocarbon condensate (20) in the first exchanger, an oil with good properties for formulating inverse emulsion drilling muds is recovered.

A16. The co-processing system for oil drilling waste according to A0, wherein in the recovery step of light hydrocarbon condensate (24) that is used in the combustion process (14 and 28), the process is self-sustaining and avoids gas emissions into the atmosphere.

A17. The co-processing system for oil drilling waste according to A0, wherein in the catalytic oxidation step of the non-condensed gases (28 and 29) all the pollutants that will exit through the chimney (30) into the atmosphere are burned.

A18. The co-processing system for oil drilling waste according to A17, wherein non-condensed gases pass to the catalytic oxidation system where an induced draft fan sends the gases to a heat exchanger to subsequently send them to the combustion chamber where all the contaminating gases are burned, additionally, they pass to a fixed bed neutralizer which absorbs the remaining contaminants to return them to the heat exchanger as the hot phase to finally exit the non-condensable gas stream through the chimney free of harmful contaminants into the atmosphere.

The invention claimed is:

1. A co-processing system for oil drilling waste comprising a mixture of water, oil and solids, wherein the co-processing system is configured to pass oil drilling waste through the following components to recover solids, water, and drilling fluids, the co-processing system comprising:
   a. an analyzer configured to analyze the oil drilling waste fed into the co-processing system;
   b. solids control equipment configured to eliminate solid waste from the oil drilling waste comprising the mixture of water, oil, and solids;
   c. a magnetic particle separator configured to separate metallic object(s) from the oil drilling waste;
   d. a mechanical separator configured to precondition the solid waste and separated metallic object(s);
   e. a variable speed mixer configured to receive the solid waste and metallic object(s) separated by the mechanical separator, wherein the variable speed mixer is further configured to receive a surfactant and mix to achieve a surfactant effect;
   f. a thermal paddle dryer configured to dry solids obtained from the variable speed mixer, wherein a top of the thermal paddle dryer comprises an outlet configured to output evaporated fluids;
   g. a hydration system comprising a shear paddle configured to hydrate the solids obtained from the thermal paddle dryer;
   h. a thermal treatment device configured to heat solids obtained from the hydration system;
   i. a dual cyclone arranged in parallel and configured to separate solid particles obtained from the thermal paddle dryer;
   j. a first heat exchanger and a second heat exchanger configured to thermally shock clean gases obtained from the dual cyclone;
   k. a first separator configured to capture micrometric particles by an effect of condensing alkali salts;
   l. wherein the first heat exchanger and a second separator are configured to recover a middle fraction hydrocarbon condensate and water;
   m. wherein the second heat exchanger and a third separator are configured to recover a light hydrocarbon condensate and water; and
   n. a catalytic oxidation system configured to burn non-condensed gases.

2. The co-processing system for oil drilling waste according to claim 1, wherein the solids control equipment is configured to remove solid objects larger than ½ inch in diameter and to separate metallic objects, further comprising a pre-conditioning mechanical segregator configured to increase a reactive surface area of the solid to increase efficiency of the surfactant effect in the mixer.

3. The co-processing system for oil drilling waste according to claim 1, wherein the thermal paddle dryer is configured to pass hydrocarbon-free solids through a lower part of the thermal paddle dryer.

4. The co-processing system for oil drilling waste according to claim 3, wherein the thermal paddle dryer is configured to use convection heating and to release fluids through a water steam drag distillation process, both of which increase an efficiency of removal of solids from hydrocarbon fluids.

5. The co-processing system for oil drilling waste according to claim 3, wherein in the paddle dryer the hydrocarbon-free solids passing through the lower part of the dryer are at a temperature of 250 to 280° C.

6. The co-processing system for oil drilling waste according to claim 1, wherein the solids hydration system is configured to receive an inorganic catalyst based on micro-silica and a chemical hydrator to form a composite material.

7. The co-processing system for oil drilling waste according to claim 6, wherein in the solids hydration system is configured to hydrate the solids using a helical paddle.

8. The co-processing system for oil drilling waste according to claim 6, wherein the solids hydration system is configured to obtain the inorganic catalyst from the burning of palm fiber, wherein the inorganic catalyst is configured to accelerate hydration reactions and to form a hydraulic binding based on hydrated calcium silicate.

9. The co-processing system for oil drilling waste according to claim 1, wherein the thermal treatment device is configured to heat solids in the presence of a microsilica-based catalyst to increase solid grain size and generate a reduction in intergranular porosity.

10. The co-processing system for oil drilling waste according to claim 1 wherein the evaporated fluids are configured to exit through an upper part of the paddle dryer at temperatures between 240 to 260° C.

11. The co-processing system for oil drilling waste according to claim 1, wherein the heat exchangers are arranged in series.

12. The co-processing system for oil drilling waste according to claim 1, wherein the gases free of solid particles are configured to exit the dual cyclone at a temperature of 210 to 220° C.

13. The co-processing system for oil drilling waste according to claim 12, wherein the first separator reduces the temperature by 20 to 30° C. and generates an agglomeration of solid particles suspended in a gas stream.

14. The co-processing system for oil drilling waste according to claim 1, wherein in the middle fraction hydrocarbon condensate comprises a medium fraction chain oil from C-14 to C18.

15. The co-processing system for oil drilling waste according to claim 1, wherein the catalytic oxidation system is configured to burn the light hydrocarbon condensate.

16. The co-processing system for oil drilling waste according to claim 1, wherein the catalytic oxidation system is in fluid communication with a chimney.

17. The co-processing system for oil drilling waste according to claim 16, further comprising a fixed bed neutralizer configured to absorb at least a portion of the non-condensed gases, and wherein the catalytic oxidation system comprises a combustion chamber configured to burn at least a portion of the non-condensed gases.

18. A co-processing system for oil drilling waste comprising a mixture of water, oil and solids, wherein the system is configured to perform a method on oil drilling waste to recover solids, water, and drilling fluids, the method comprising:
   a. analyzing oil drilling waste fed into the co-processing system;
   b. eliminating solid waste and separating metallic object(s) from the oil drilling waste comprising the mixture of water, oil, and solids;
   c. preconditioning the solid waste and separated metallic object(s) in a mechanical separator;
   d. mixing the preconditioned solid waste and metallic object(s) in a variable speed mixer configured to receive the solid waste and metallic object(s) separated by the mechanical separator, wherein the mixing is performed with an added surfactant to achieve a surfactant effect;
   e. drying the solids obtained from the variable speed mixer in a thermal paddle dryer;
   f. hydrating solids obtained from the thermal paddle dryer;
   g. heating solids obtained from the hydrating step;
   h. passing evaporated fluids from an outlet positioned on a top of the thermal paddle dryer;
   i. separating solid particles obtained from the thermal paddle mixer in a dual cyclone arranged in parallel;
   j. thermally shocking clean gases obtained from the dual cyclone in a first and a second heat exchanger;
   k. condensing alkali salts from a stream obtained from the first and second heat exchangers;
   l. recovering a middle fraction hydrocarbon condensate and water from the first heat exchanger and a first separator;
   m. recovering a light hydrocarbon condensate and water from the second heat exchanger and a second separator; and
   n. catalytically oxidizing non-condensed gases.

19. The method of claim 18, wherein the first and second heat exchangers are arranged in series.

* * * * *